United States Patent [19]

Mayle

[11] Patent Number: 4,740,131

[45] Date of Patent: Apr. 26, 1988

[54] APPARATUS FOR LIFTING AND CARRYING HEAVY LOADS

[76] Inventor: Steven R. Mayle, 153 St. Thomas Dr., Fremont, Ohio 43420

[21] Appl. No.: 23,723

[22] Filed: Mar. 9, 1987

[51] Int. Cl.$^4$ .............................................. B60P 3/00
[52] U.S. Cl. .................................... 414/460; 414/461; 414/911; 212/218
[58] Field of Search ...................... 187/8.5, 11, 20, 21, 187/9 R, 9 E; 414/426, 427, 908, 910, 911, 506, 540, 544, 546, 559, 459, 667, 671, 560, 461, 495, 556, 557, 592, 498, 608; 212/71, 83, 97, 98, 205, 208, 218, 219, 220

[56] References Cited

U.S. PATENT DOCUMENTS

| 1,175,312 | 3/1916 | Simpson | 280/47.11 |
| 2,657,938 | 11/1953 | Browne et al. | 414/460 X |
| 2,702,139 | 2/1955 | Faustine | 414/911 X |
| 3,541,598 | 11/1970 | Dousset | 414/459 |
| 3,750,811 | 8/1973 | Anderson et al. | 414/460 |
| 3,759,409 | 9/1973 | Wenzel et al. | 414/460 |
| 3,831,791 | 8/1974 | Gonzales | 414/461 |
| 4,295,777 | 10/1981 | Bell et al. | 414/911 X |
| 4,502,568 | 3/1985 | Lebre | 414/667 X |
| 4,573,846 | 3/1986 | Willbanks et al. | 414/911 X |

FOREIGN PATENT DOCUMENTS 885599 12/1961 United Kingdom ................ 187/8.5

Primary Examiner—Robert J. Spar
Assistant Examiner—Vien Nguyen
Attorney, Agent, or Firm—Marshall & Melhorn

[57] ABSTRACT

An apparatus for lifting and carrying heavy loads includes a generally horizontally extending support beam attached between a pair of generally vertically extending posts. The distance between the ends of the support beam is selectively adjustable. The bottom end of each support post is attached to a side beam and the side beams are connected together at a front end by a steering mechanism and at a rear end by a beam assembly. Both the steering mechanism and the beam assembly are selectively adjustable to vary the distance between the side beams to correspond to the distance between the ends of the support beam thereby maintaining the posts in a generally parallel relationship. Ground engaging wheels are rotatably attached to the side beams and the steering mechanism. A load carrying bar is connected by cable to a winch which is mounted on the support beam for releasably engaging and lifting a heavy load such as a roll of roofing material.

22 Claims, 2 Drawing Sheets

APPARATUS FOR LIFTING AND CARRYING HEAVY LOADS

BACKGROUND OF THE INVENTION

The present invention relates in general to an apparatus for lifting and carrying large, heavy loads and, in particular, to an apparatus for moving rolls of roofing material.

Many commercial buildings are constructed with a relatively flat roof. Such roofs are typically covered with strips of roofing material which are delivered to the building site in large, heavy rolls. These rolls must be lifted to the roof of the building and then typically moved by hand by the workers installing the roofing material. Such an operation is difficult and time consuming.

SUMMARY OF THE INVENTION

The present invention relates to an apparatus for lifting and carrying large, heavy objects and is especially adapted for moving rolls of roofing material on a building roof. The frame of the apparatus can be easily disassembled for movement between the ground and the roof of the building. Furthermore, the frame incorporates adjustments for both width and height in order to accommodate different size loads. A generally horizontally extending support beam is attached at opposite ends to a pair of spaced apart generally vertically extending posts. The lower end of each post is attached to a generally horizontally extending side frame having a ground engaging rotatably attached wheel at one end and a steering mechanism support attached at the other end.

The steering mechanism includes a steerable centrally mounted wheel assembly attached to a steering and pulling handle. The rear end of the frame includes a removable connecting bar which permits the frame to be backed up to a roll with the side frames adjacent either end of the roll. A supporting bar is adapted to extend through the center of a roll and has its ends attached to cables which are connected to a winch mounted on the support frame. The winch is utilized to raise the roll for movement along the roof and then lower the roll for dispensing the roofing material. The support bar includes adjustable means for changing the width or distance between the vertical support posts and also includes means for adjusting the height of the support bar with respect to the vertical posts.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
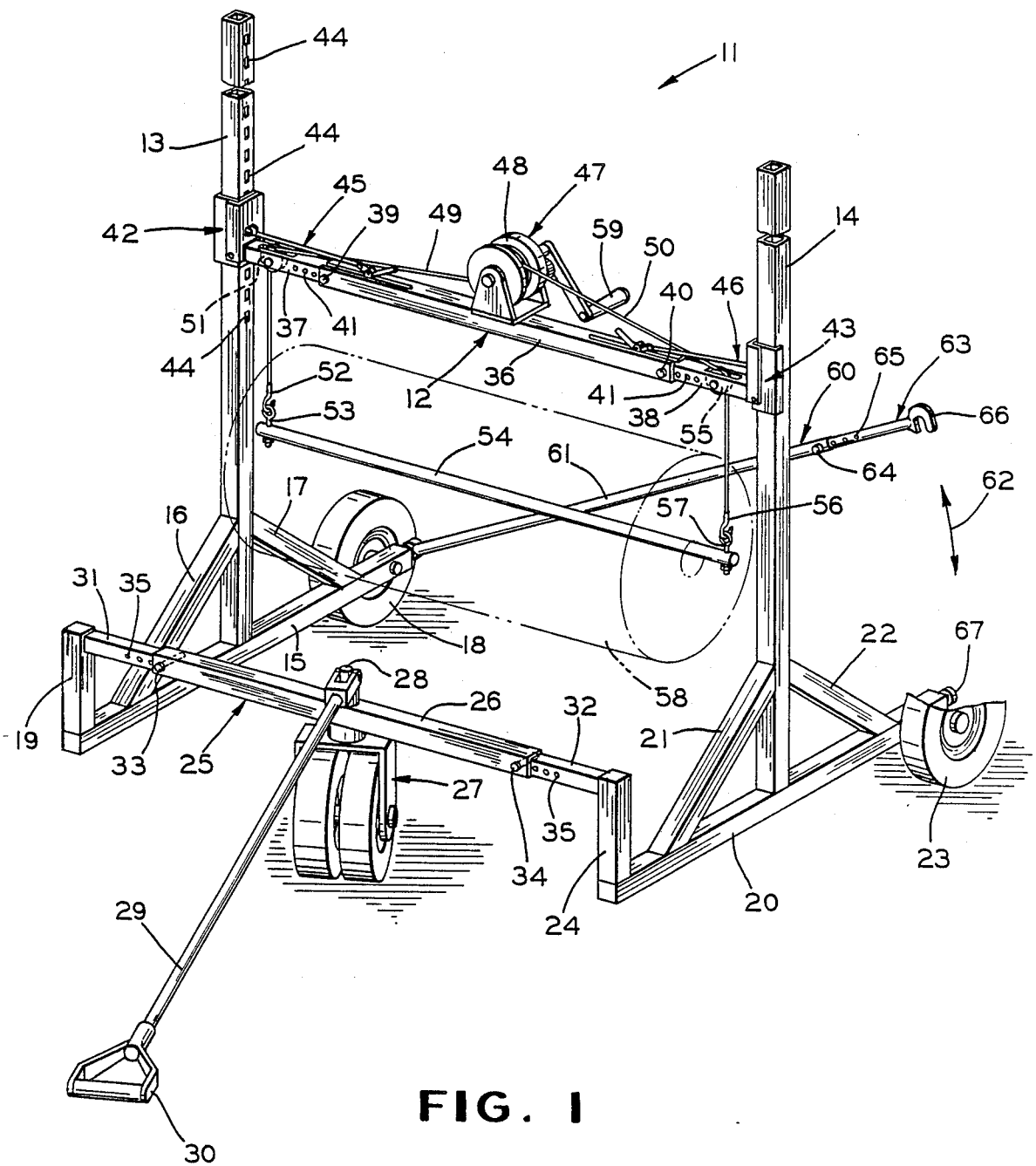
FIG. 1 is a perspective view of a load lifting and carrying apparatus according to the present invention.
Figure 2:
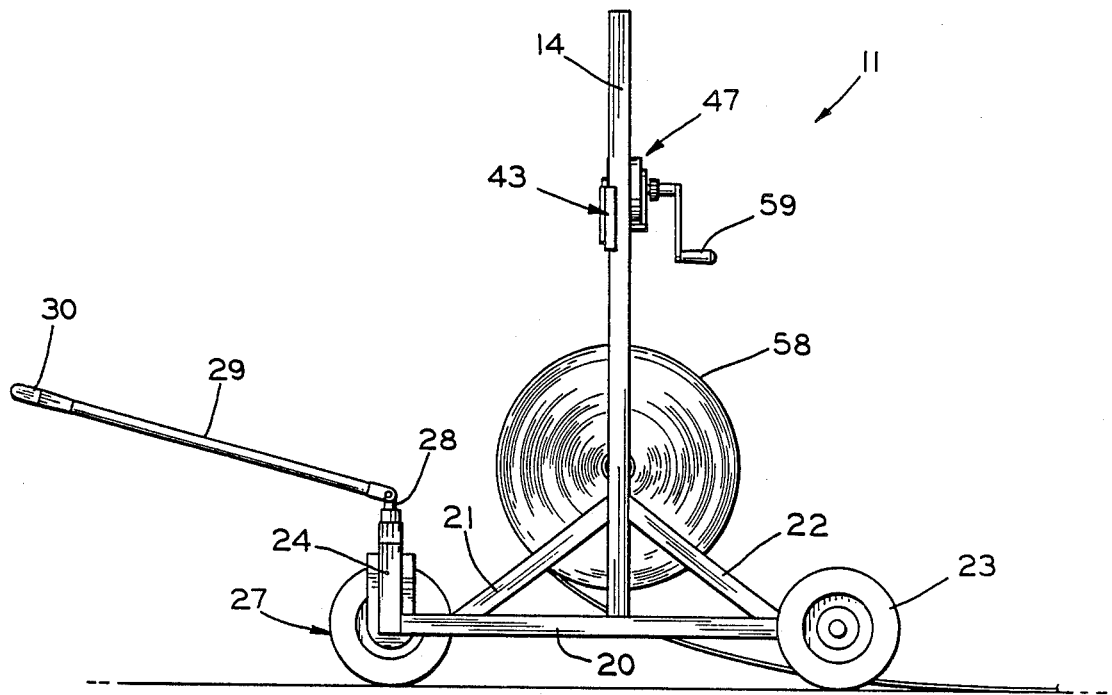
FIG. 2 is a side elevational view of the apparatus shown in FIG. 1 carrying a roll of roofing material.

A lifting and carrying apparatus 11 according to the present invention is shown in FIGS. 1 and 2. The apparatus 11 includes a generally horizontally extending support beam 12 attached at opposite ends to a pair of generally vertically extending posts 13 and 14. A lower end of the post 13 is attached to a central portion of a generally horizontally extending side beam 15. A pair of bracing beams 16 and 17 are attached to and extend between the vertical post 13 and the side beam 15 on opposite sides of the point of connection between the post 13 and the beam 15.

A ground engaging wheel 18 is rotatably attached at a rear end of the side beam 15. At the forward end of the side beam 15 there is attached a generally vertically extending short beam 19. The opposite side of the apparatus 11 is similar in construction with a lower end of the vertical post 14 attached to a side beam 20. A pair of bracing beams 21 and 22 extend between the post 14 and the side beam 20. A ground engaging wheel 23 is rotatably attached to a rear end of the side beam 20 and a short beam 24 extends vertically from and is attached to a front end of the side beam 20.

The upper ends of the short beams 19 and 24 are attached to opposite ends of a steering mechanism 25. The steering mechanism 25 includes a generally horizontally extending tubular beam 26 upon which is mounted a steering wheel assembly 27. The steering wheel assembly 27 is rotatably mounted about a vertical axis. Although dual wheels are shown, a single wheel assembly or any other type of known steering mechanism could be utilized. An upper end 28 of the steering wheel assembly 27 extends above the upper surface of the tubular beam 26 and is attached to one end of a steering rod 29. The opposite end of the steering rod 29 has a handle 30 attached thereto which handle is adapted to be griped by a human hand. The rod 29 is pivotally attached to the upper end 28 for rotation about a generally horizontal axis to enable the handle 30 to be positioned at an appropriate height for an operator. Thus, the operator can apply a force through the handle 30 and steering rod 29 to move the lifting and carrying apparatus 11 in a desired direction and can control the direction of movement through the rotation of the steering wheel assembly 27.

One end of each of a pair of generally horizontally extending adjustment beams 31 and 32 is attached to an upper end of a respective one of the short beams 19 and 24. The opposite ends of the adjustment beams 31 and 32 extend inside open ends of the tubular beam 26. A pair of locking pins 33 and 34 extend through holes formed in the tubular beam 26 and corresponding holes formed in the adjustment beams 31 and 32 respectively to lock the steering mechanism 25 in place. The beams 31 and 32 each have a plurality of other apertures 35 formed therein for cooperation with the locking pins 33 and 34 to permit adjustment of the distance between the short beams 19 and 24 thereby permitting the width of the lifting and carrying apparatus to be adjusted.

The horizontal support beam 12 also can be adjusted to maintain the distance between the vertical posts 13 and 14 in correspondence with the distance between the short beams 19 and 24. A tubular beam 36 extends in a generally horizontal direction between the vertical post 13 and 14. A pair of adjustment beams 37 and 38 each have one end attached to a corresponding one of the vertical posts 13 and 14. The opposite ends of the adjustment beams 37 and 38 extend inside the open ends of the tubular beam 36. A pair of locking pins 39 and 40 extend through apertures formed in the ends of the tubular beam 36 and through corresponding apertures formed in the adjustment beams 37 and 38 respectively. The locking pins 39 and 40 can also cooperate with any of a plurality of other apertures 41 formed in the adjustment beams 37 and 38 to vary the distance between the vertical posts 13 and 14.

The horizontal support beam 12 is vertically adjustable. The adjustment beams 37 and 38 are attached to the vertical posts 13 and 14 respectively by a pair of sleeves 42 and 43 respectively. The sleeve 42 slidably engages the vertical post 13 and is attached to the adjustment beam 37. The sleeve 43 slidably engages the vertical post 14 and is attached to the adjustment beam 38. The vertical post 13 has a plurality of apertures 44 formed therein along a generally vertically extending axis and facing the end of the adjustment beam 37. A releasable locking mechanism 45 is attached between the tubular beam 36 and the sleeve 42 for engaging a selected one of the apertures 44 thereby locking the horizontal support beam 12 at a desired vertical height. A second releasable locking mechanism 46 is attached between the tubular beam 36 and the sleeve 43 and operates in a similar manner to engage apertures (not shown) formed in the vertical post 14. The locking mechanisms 45 and 46 will be discussed in more detail with reference to FIG. 3.

A winch 47 is mounted on an upper surface of the tubular beam 36. The winch 47 includes a drum 48 to which are attached one end of each of a pair of cables 49 and 50. The cable 49 extends around a pulley 51 rotatably mounted inside the adjustment beam 37. The opposite end of the cable 49 is attached to a hook 52 which engages an eye of an eye bolt 53. The opposite end of the eye bolt 53 is attached to one end of a load carrying bar 54. Similarly, the cable 50 extends around a pulley 55 rotatably mounted inside the adjustment beam 38. The opposite end of the cable 50 is attached to a hook 56 which engages an eye of an eye bolt 57. The eye bolt 57 is attached to the opposite end of the load carrying bar 54. Thus, the hooks 52 and 56 can be disengaged from the respective eye bolts 53 and 57 to release the load carrying bar 54. The bar 54 can be inserted through the center of a roll of roofing material 58 (shown in phantom). The hooks 52 and 56 can be re-engaged with the eye bolts 53 and 57. The roll 58 can be raised by rotating a crank arm 59 attached to the drum 48. Typically, the winch 47 includes a ratching mechanism with a reversible dog for permitting both raising and lowering of the load carrying bar 54 and its associated load. Although a roll 58 of roofing material is shown, the present invention can be utilized to lift and carry many different large and/or heavy loads.

In order to provide additional rigidity to the apparatus 11, the ends of the side beams 15 and 20 to which the wheels 18 and 23 are attached are connected together by a rear beam assembly 60. The beam assembly 60 includes a tubular beam 61 having one end rotatably attached to the side beam 15 for rotation about a generally horizontal axis in the direction of an arrow 62. The opposite end of the tubular beam 61 is open and receives therein one end of an adjustment connector 63. The tubular beam 61 and the adjustment connector 63 are attached by a locking pin 64 which extends through apertures formed in the tubular beam 61 and corresponding apertures formed in the adjustment connector 63. The adjustment connector 63 has other apertures 65 formed therein for cooperating with the locking pin 64 in order to determine the distance between the ends of the side beams 15 and 20. The opposite end of the adjustment connector 63 has a generally U-shaped downwardly facing hook 66 attached thereto for engaging a generally horizontally extending post 67 attached to an end of the side beam 20. Thus, opposite sides of the apparatus 11 are held in spaced apart relationship by the horizontal support beam 12, the steering mechanism 25, and the rear beam assembly 60. When it is desired to move the lifting and carrying apparatus 11 into position to pick up a load, the rear beam assembly 60 is rotated upwardly to a generally vertical position to enable the apparatus 11 to be backed toward the load until the horizontal support beam 12 is positioned above the load. The rear beam assembly 60 is lowered into the horizontal locking position to enable the load to be moved.

Figure 3:
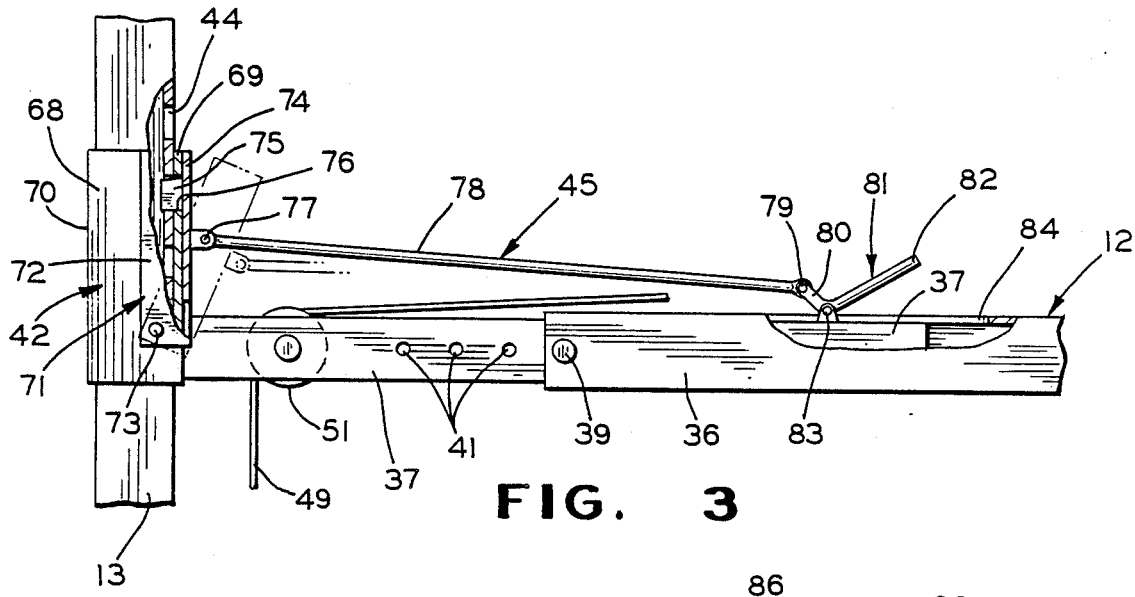
FIG. 3 is an enlarged fragmentary front elevational view of the vertical positioning mechanism of the apparatus shown in FIG. 1.

Referring to FIG. 3, there is shown in more detail the sleeve 42 and the releasable locking mechanism 45. The sleeve 42 has a generally U-shaped body having a front wall 68 attached to generally parallel spaced apart inner side wall 69 and outer side wall 70. The spacing between the side walls 69 and 70 corresponds to the width of the vertical post 13 to enable the sleeve 42 to slidably engage the outer surfaces of the post 13. An L-shaped bracket 71 has a front wall 72 abutting the front wall 68 and pivotally connected at 73 thereto. A side wall 74 of the bracket 71 abuts the inner side wall 69 of the sleeve 42. A lug 75 is formed on a surface of the side wall 74 facing the vertical post 13. The lug 75 extends through an aperture 76 formed in the inner side wall 69 and engages one of the apertures 44 formed in the vertical post 13. Thus, the sleeve 42 is locked against vertical movement along the vertical post 13.

An outer surface of the side wall 74 is pivotally connected to one end of a link arm 78 of the releasable locking mechanism 45. The opposite end of the link arm 78 is pivotally connected at 79 to a shorter arm 80 of a lever 81. The lever 81 is generally L-shaped and has a longer arm 82 attached to the shorter arm 80. The junction of the arms 80 and 82 is pivotally connected at 83 to an upper surface of the adjustment beam 37. The pivotal connection 83 extends through a slot 84 formed in an upper surface of the tubular beam 36. The slot 84 is dimensioned to permit movement of the pivotal connection 83 in accordance with the selected engagement of the locking pin 39 with any of the apertures 41. When downwardly directed pressure is applied to the lever arm 82, the lever 81 pivots about the pivot point 83 thereby causing the bracket 71 to pivot about the pivot point 73 and move to a disengaged position as shown in phantom. Such movement disengages the lug 75 from the selected one of the apertures 44 thereby permitting the entire horizontal support beam 12 to be moved away from the vertical post 13. The sleeve 43 and releasable locking mechanism 46 are similar in construction and operation.

Figure 4:
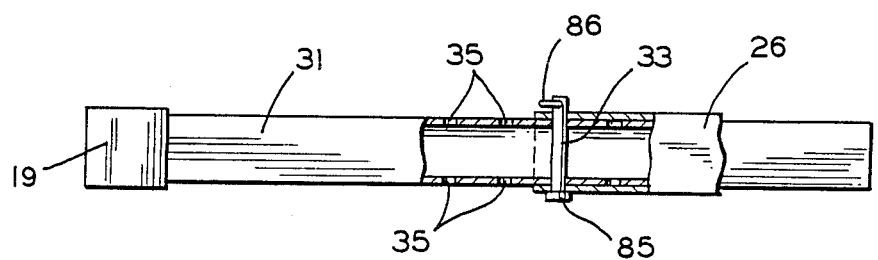
FIG. 4 is an enlarged top plan view of the width adjustment mechanism of the apparatus of FIG. 1.

There is shown in FIG. 4 the adjustable connection of the tubular beam 26 and the adjustment beam 31. The tubular beam 26 includes a pair of apertures through which the locking pin 33 extends. The adjustment beam 31 has a plurality of pairs of apertures 35 formed therein any pair of which can be aligned with the apertures in the tubular beam 26 for accepting the locking pin 33. One end of the locking pin 33 has an enlarged head 85 formed thereon. The opposite end of the locking pin 33 can have an aperture formed therein for accepting a retention means such as a cotter pin 86.

The lifting and carrying apparatus 11 according to the present invention can be disassembled for transportation both to the job site and from the ground to the roof of a building. The locking pins 33 and 34 can be removed to disengage the tubular beam 26 and associated steering wheel assembly 27. The releasable locking mechanisms 45 and 46 can be actuated to disengage the horizontal support beam 12 from the vertical posts 13 and 14. The rear beam assembly 60 can be releasably attached to the side beam 15 for disassembly. If necessary, one or more of the subassemblies can be designed to be broken down into additional subassemblies for ease of storage and transportation. The subassemblies are easily reassembled and the apparatus 11 is ready for lifting and carrying large and heavy loads.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed:

1. An apparatus for lifting and carrying loads comprising:
   a generally horizontally extending support beam including means for adjusting the distance between opposite ends of said support beam;
   a pair of generally vertically extending posts each attached at a lower end to one of a pair of generally horizontally extending side beams with said side beams having at least one ground engaging wheel;
   means for releasably attaching each said end of said support beam to a corresponding one of said posts;
   means for adjusting the distance between said posts to correspond to the distance between said ends of said support beam including a tubular beam, a pair of adjustment beams connected at their outer ends to said side beams and telescopically engaging at their inner ends opposite ends of said tubular beam and means for releasably attaching said adjustment beams to said tubular beam;
   a steering mechanism having at least one ground engaging wheel mounted on said tubular beam for rotation about a generally vertical axis and a steering rod attached to said wheel; and
   means attached to said support beam for releasably engaging and lifting a load.

2. The apparatus according to claim 1 wherein said support beam is tubular and said means for adjusting the distance between opposite ends includes at least one adjustment beam telescopically engaging said support beam and means for releasably attaching said adjustment beam to said support beam.

3. The apparatus according to claim 2 wherein said means for releasably attaching said adjustment beam to said support beam includes at least one aperture formed in each of said adjustment beam and said support beam and a locking pin for engaging said apertures.

4. The apparatus according to claim 2 wherein said means for releasably attaching said adjustment beam to said support beam includes a plurality of apertures of which at least one is formed in said adjustment beam and another one is formed in said support beam, and a locking pin for engaging said apertures.

5. The apparatus according to claim 1 wherein said support beam is tubular and said means for adjusting the distance between opposite ends includes a pair of adjustment beams telescopically engaging said support beam at said opposite ends and means for releasably attaching said adjustment beams to said support beam.

6. The apparatus according to claim 1 wherein each said post lower end is attached to one of a pair of generally horizontally extending side beams and said one ground engaging wheel is rotatably attached to one end of each of said side beams.

7. The apparatus according to claim 6 wherein said means for adjusting the distance between said posts includes a beam assembly having one end rotatably attached to one of said side beams and an opposite end releasably attached to the other one of said side beams.

8. The apparatus according to claim 7 wherein said beam assembly includes a tubular beam having one end rotatably attached to said one side beam for rotation about a generally horizontal axis, and an adjustment connector telescopically engaging an opposite end of said tubular beam.

9. The apparatus according to claim 8 wherein one end of said adjustment connector has a generally U-shaped downwardly facing hook attached thereto for engaging a generally horizontally extending post attached to said other one of said side beams.

10. The apparatus according to claim 8 wherein said means for adjusting the distance between said posts includes at least one aperture formed in each of said tubular beam and said adjustment connector, and a locking pin for engaging said apertures.

11. The apparatus according to claim 8 wherein said means for adjusting the distance between said posts includes a plurality of apertures at least one of which is formed in said tubular beam and at least another one is formed in said adjustment connector, and a locking pin for engaging said apertures.

12. The apparatus according to claim 6 wherein said means for adjusting the distance between said posts includes a tubular beam and at least one adjustment beam telescopically engaging said tubular beam and means for releasably attaching said adjustment beam to said tubular beam.

13. The apparatus according to claim 12 wherein said means for releasably attaching said adjustment beam to said tubular beam includes at least one aperture formed in each of said adjustment beam and said tubular beam, and a locking pin for engaging said apertures.

14. The apparatus according to claim 12 wherein said means for releasably attaching said adjustment beam to said tubular beam includes a plurality of apertures at least one of which is formed in said adjustment beam and another one is formed in said tubular beam, and a locking pin for engaging said apertures.

15. The apparatus according to claim 6 wherein said means for adjusting the distance between said posts includes a pair of generally vertically extending beams connected between said side beams and said adjustment beams.

16. The apparatus according to claim 1 wherein said means for releasably attaching each end of said support beam to a corresponding one of said posts includes a sleeve attached to said support beam and slidably engaging one of said posts, and a releasable locking mechanism attached to said support beam and releasably engaging an aperture formed in said post.

17. The apparatus according to claim 16 wherein said sleeve is generally U-shaped having generally parallel spaced apart side walls connected to a front wall, and said releasable locking mechanism includes a generally L-shaped bracket having a front wall pivotally connected to said front wall of said sleeve and attached to a side wall having a lug formed therein for engaging said aperture in said post, and a lever mechanism connected between said support beam and said side wall of said bracket for selected movement of said lug with respect to said aperture.

18. The apparatus according to claim 1 wherein said means for releasably engaging and lifting a load includes a winch mounted on said support beam, a load engaging bar, and cable means conencted between said winch and said bar.

19. The apparatus according to claim 18 including means for releasably attaching said bar to said cable.

20. An apparatus for lifting and carrying loads comprising:
- a generally horizontally extending support beam telescopically engaging a pair of adjustment beams and means for releasably attaching said adjustment beams to said support beam;
- a pair of vertically extending posts each attached at a lower end to one of a pair of generally horizontally extending side beams;
- means for releasably attaching said adjustment beams to said posts;
- a steering mechanism attached to one end of each of said side beams and including a tubular beam telescopically engaging a pair of adjustment beams and means for releasably attaching said adjustment beams to said tubular beam, said adjustment beams being connected to said side beams, and a steering wheel rotatably mounted on said tubular beam;
- a beam assembly having a tubular beam with one end rotatably attached to one of said side beams and an opposite end telescopically engaging an adjustment connector and means for releasably attaching said tubular beam to said adjustment connector, said adjustment connector releasably engaging the other one of said side beams; and
- means attached to said beam for releasably engaging and lifting a load.

21. An apparatus for lifting and carrying loads comprising:
- a generally horizontally extending support beam;
- a pair of generally vertically extending posts each attached at a lower end to one of a pair of generally horizontally extending side beams;
- means for releasably attaching said support beam to said posts including a pair of sleeves each attached to an opposite end of said support beam and slidably engaging a corresponding one of said posts and a releasable locking mechanism attached to said support beam and releasably engaging an aperture formed in each of said posts; a tubular beam, a pair of adjustment beams connected at their outer ends to said side beams and telescopically engaging at their inner ends to opposite end of said tubular beam;
- a steering mechanism attached to said tubular beam and including a ground engaging wheel;
- a pair of ground engaging wheels rotatably attached to said side beams;
- a connector having one end rotatably attached to one of said side beams for rotation about a generally horizontal axis and an opposite end releasably attached to the other one of said side beams; and
- means attached to said support beam for releasably engaging and lifting a load.

22. An apparatus for lifting and carrying loads comprising:
- a generally horizontally extending support beam including means for adjusting the distance between opposite ends of said support beam;
- a pair of generally vertically extending posts each having a lower end attached to at least one ground engaging wheel; means attached to said support beam for releasably engaging and lifting a load;
- means for releasably attaching each said end of said support beam to a corresponding one of said posts, said means for releasably attaching including a generally U-shaped sleeve attached to said support beam and slidably engaging one of said posts with a pair of generally parallel said walls connected to a front wall and further including a releasable locking mechanism attached to said support beam having a generally L-shaped bracket with a front wall pivotally connected to said front wall of said sleeve and attached to a side wall having a lug formed therein for engaging an aperture formed in said one post, and a lever mechanism connected between said support beam and said side wall of said bracket for selected movement of said lug with respect to said aperture.

* * * * *